Aug. 1, 1950     S. I. MacDUFF     2,517,005

VALVE

Filed March 14, 1946

INVENTOR.
STANLEY I. MacDUFF
BY Cecil F. Avens
ATTORNEY

Patented Aug. 1, 1950

2,517,005

UNITED STATES PATENT OFFICE 2,517,005

VALVE

Stanley I. MacDuff, South Bend, Ind., assignor to Bendix Aviation Corporation, South Bend, Ind., a corporation of Delaware Application March 14, 1946, Serial No. 654,416

9 Claims. (Cl. 60—54.6)

This invention relates generally to valves, and more particularly to that type of valve for use in a hydraulic system on a vehicle where the flow of fluid from a single pump must be utilized to operate a plurality of instruments, such as a steering gear and brakes, for example.

It is therefore an object of the invention to provide an operator operated valve which controls the flow of fluid from a single pump to steering gear and brakes.

It is a further object of the invention to provide a valve for use in a hydraulic system on a vehicle, operable to proportion the flow of fluid from a single pump, between the steering gear and brakes.

A still further object of the invention resides in the provision of a valve in a hydraulic system to normally connect one of the devices in the system to system flow, and another of the devices of the system to reservoir.

Another important object of the invention resides in the provision of a valve for a hydraulic system, which valve is constructed and arranged to normally connect the steering gear to the pump and disconnect the brakes therefrom.

A further important object of the invention resides in the provision of a valve for use with an open fluid system having a steering gear therein and a closed fluid system having a booster unit therein, said valve so constructed and arranged that the flow of fluid to the steering gear can be diverted to act on said booster unit to put fluid in the closed system under pressure.

Another very important object of the invention resides in the provision of an operator operated valve which produces "position sense" and "feel" in accordance with the braking effort of the operator.

The above and other objects and features of the invention will be apparent from the following description of the device taken in connection with the accompanying diagrammatic drawing which forms a part of the specification and in which.

Figure 1:
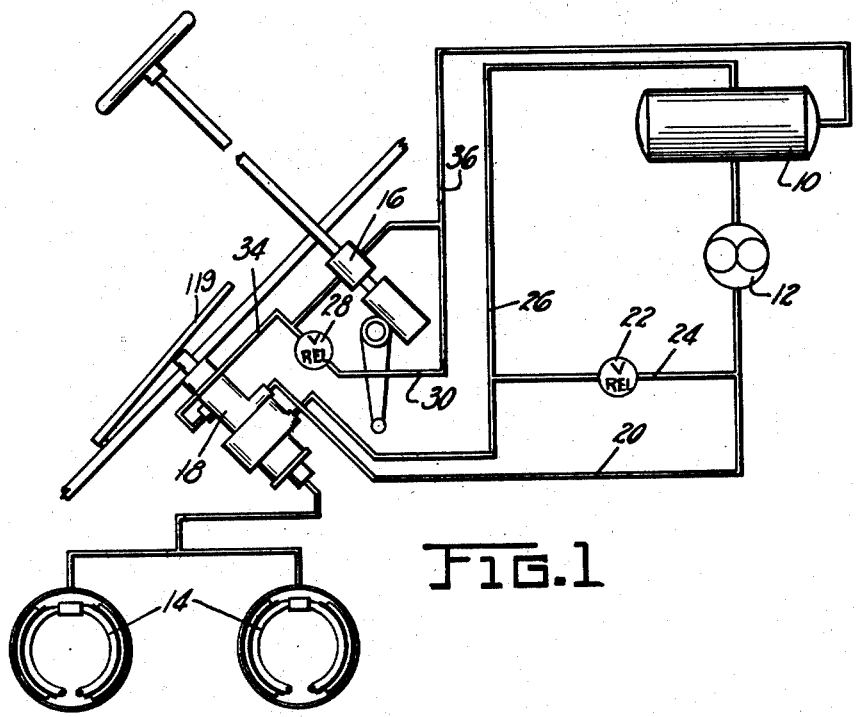
Figure 1 is a hydraulic system incorporating the device of the invention.

Referring to Figure 1 of the drawing, numeral 10 designates a fluid reservoir which supplies fluid to a pump 12 which puts the fluid under pressure to actuate brakes 14 and furnish fluid to a steering gear valve 16 to aid in steering a vehicle, not shown. All of the steering gear connections to the fluid pressure system are not shown since they form no part of the present invention. The brakes 14 and the steering gear valve 16 are connected to the reservoir 10 and pump 12 through an operator operated valve 18. To prevent the pressure on the fluid in line 20, which connects the pump 12 to valve 18, from rising above a predetermined value, a relief valve 22 is connected in line 24 which connects the line 20 to a line 26. Line 26 connects the valve 18 to the reservoir To protect the steering gear valve from abnormally high pressures, a relief valve 28 is disposed in a line 30 which is arranged in the system to shunt the steering valve. A line 30, into which the relief valve 28 is inserted, is connected to lines 34 and 36. Lines 34 and 36, respectively, connect the steering gear valve 16 to the operator operated valve 18 and to the reservoir 10.

Valve 16 is of conventional open center type construction, as shown in Patent 1,937,470, and permits the free flow of fluid therethrough at times when steering is not required.

Figure 2:
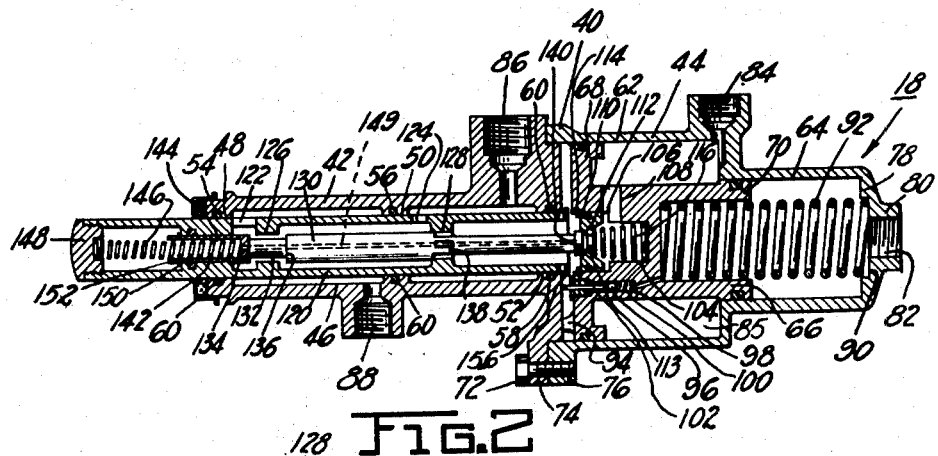
Figure 2 is a sectional elevation showing the invention.
Figure 3:
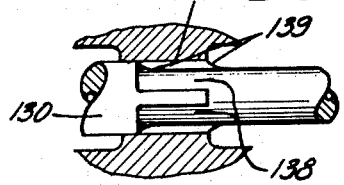
Figure 3 is an enlarged view in detail of a portion of the piston valve which forms a part of the invention.

Referring to Figure 2, valve 18 comprises a body 40 having two sections 42 and 44. Section 42 includes a bore 46 having lands 48, 50 and 52 therein, which lands are grooved at 54, 56 and 58 to receive seals 60. Section 44 includes a stepped bore 62 and 64 to accommodate a piston 66 having a large head 68 at one end and a smaller head 70 at the other end. The two sections are held together by bolts 72 which engage flanges 74 and 76 integrally related to the sections 42 and 44 respectively at their ends. When the sections are joined together they provide a single bore with the piston located in one end. One end of bore 64 is closed at 78 and is provided with a boss 80 drilled and threaded at 82 to receive a conduit for connecting the brakes 14 to said one end of the bore. Section 44 is equipped with a reservoir port 84 which opens into the large bore 62. The piston 66 and bore 62 are together constituted to provide an axial extending annular chamber 85, which is in constant communication with said reservoir port. Section 42 includes a pumping port 86 which terminates in the cylinder 46 between the lands 50 and 52, and a steering gear port or working port 88 which terminates in cylinder 46 between the lands 48 and 50. The end 78 is counterbored at 90 to receive one end of a spring 92, the free end of which engages the piston 66 to normally urge the same to the position shown. A projection 94 is carried by the large head 68 of the piston to form a stop which abuts the flange 74 when the piston is in its extreme leftward position. A ball valve 96 is disposed in a passage 98 which connects the ends of the piston 66. The ball valve 96 is normally urged to close the passage 98 by a spring 100. A longitudinally slotted valve pin 102 is arranged in the passage to unseat the ball valve 96 when the piston 66 is biased to its extreme leftward position as aforementioned. Unseating ball valve 96 permits the free passage of fluid from the braking or working port 82 to the reservoir port 84. The piston 66 is bored longitudinally at 104, counterbored at 106 and bored radially at 108, to thereby furnish a passage or conduit connecting the chamber 85 to said one end of the piston. A valve element 110 having a valve seat 112 is slidably disposed in the counterbore 106. The valve element is centrally bored at 113. A retainer washer 114 is located in the counterbore to arrest movement of the valve element 110 to the left under the influence of a spring 116. The reservoir port 84 opens into the bore 62 intermediate the large head 68 and the small head 70 of the piston 66. Communication between the working port 82 and the reservoir port 84, when the piston 66 is in the position shown, is through passage 98, bore 113 of the valve element, longitudinal bore 104 and radial bore 108 of the piston 66.

To control the flow of fluid between the pumping port 86 and the working port 88, operator operated means is slidably disposed in section 42 and comprises a sleeve 120 having radial openings 122 and 124 connecting the interior of the sleeve to the exterior thereof. The radial openings are located in the sleeve to by-pass the fluid around the land 50 and seal 60 which would otherwise form a barrier to the passage of fluid between the pumping port and working port 88. Pumping port 86 is located on one side of the land 50 and the working port 88 is located on the other side of the land so that fluid passing from the port 86 to port 88 must pass through the radial openings 122 and 124. Lands 126 and 128 are formed interiorly of sleeve 120 to cooperate with a piston valve 130 to control the flow of fluid to the port 88. The piston valve 130 which is relatively movable with respect to sleeve 120, has a reduced portion 132 formed between shoulders 134 and 136 to provide a variable opening to port 88. To control the flow of fluid from the pumping port 86 to the large end of piston 66, piston valve 130 is slotted at 138 to register with land 128. The slots have inclined faces 139 to provide close regulation of the initial flow of fluid to the large head 68 of the piston. One end of the piston valve is provided with a valve head 140 which engages the valve seat 112 of the valve element 110 to cut off communication from the left end of piston 66 to the reservoir port 84. The end of the piston valve on the opposite end from the valve head 140 slides in a bearing 142 of the sleeve 120. That portion of the piston valve which slides in the bearing 142 is bored at 144 to receive one end of a relatively light spring 146, the other end of which abuts a cap 148 threadedly engaging one end of the sleeve 120 to close the same and to form a bearing point on which the pedal 119 rests. A longitudinal passage 149 in the piston valve connects the two ends of the piston valve so that it will be hydraulically balanced across its ends. The spring 146 urges the piston valve 130 to a normal relative position in the sleeve where the shoulders 134 and 136 of the piston valve are equally spaced from the land 126 and the slots 138 are completely covered by land 128 to thereby establish communication between the pumping port 86 and the working port 88 and to cut off communication between the pumping port and the large end of the piston 66. A washer 150 is received by an annulus 152 of the piston valve to provide a stop which locates the piston valve within sleeve 120. The sleeve 120 is limited in its movement to the left by an element 156 secured to the end of the sleeve and so constituted to engage the land 52.

When valve 18 is mounted in the position shown in Figure 1, the weight of the piston valve, sleeve and pedal 119 tend to seat the valve head 140 on the seat 112 to normally close the passage 113. The arrangement between valve head 140 and valve seat 112 is such as to act as a relief valve should the pressure acting on the large head 68 of piston 66 become excessive. Should hydraulic power fail, sleeve 120 is moved to the right until element 156 of the sleeve engages the large end of the piston 66 to move the piston to the right to manually build up sufficient pressure behind piston 66 to operate the brakes.

The relationship between lands 126 and 128 to shoulder 136 and slots 138, respectively, is such that slots 138 are slightly uncovered to admit fluid under pressure to the large end of the piston before shoulder 136 laps land 126. This prevents completely sealing off the pump.

Operation of the device of the invention is as follows:

With the parts of the device in the positions shown in Figure 2, fluid from the reservoir is pumped through port 86 between the right end of sleeve 120 and section 42, through opening 124, through the interior of the sleeve, past opening 122, then between the left end of sleeve 120 and section 42, and thence into port 88 which is connected to the steering valve. Since the steering valve is of the open center type, fluid leaving the working port 88 passes freely through the steering valve back to reservoir when steering is not required.

To perform a brake application, some or all of the fluid normally used for steering is diverted therefrom to be used for actuating the brakes. To divert the fluid, as aforementioned, the operator of the vehicle, not shown, depresses pedal 119 which moves sleeve 120 relative to the piston valve 130. This movement of the sleeve to the right uncovers the slots 138 of the piston valve to admit fluid under pressure to the large head 68 of piston 66 to cause movement of the piston 66 to the right. Movement of the piston to the right permits the head 140, which is carried by the piston valve, to follow to the right with the piston since the piston valve is spring-loaded by the spring 146. It will be noted also that the fluid under pressure acting on the large head 68 acts on the right end of sleeve 120 tending to urge it to the left against the force applied to the pedal by the operator. Therefore, the greater the force acting on the piston tending to move the piston to the right, the greater is the force acting on the right end of the sleeve 120 tending to counteract the applied force on the pedal. With this arrangement we have not only "position control," but "feel." Since the system beyond the small head 70 of piston 66 is a closed system, movement of the piston to the right puts the fluid in the brakes under pressure. In the instant application, the unit pressure produced on the right end of piston 66 is greater than the unit pressure acting on the left end of the piston urging it to the right. This is commonly known as a booster arrangement and is used where a higher pressure is needed for operating the brakes than is available at the pump.

During steering, the fluid in the system between the pump and the steering valve is put under pressure. Therefore, if a brake application is made at this time, there will be immediately available for initial braking, fluid under pressure, to admit past slots 138 to act on the large end of piston 66. However, as aforementioned, when steering is not taking place there is only enough pressure on the fluid to overcome the resistance of the system offered to the flow of fluid. Hence in making a brake application when steering is not taking place, movement of sleeve 120 must be to the right far enough to provide a substantial restriction to the flow past shoulder 136 so as to quickly build up a pressure in port 86 to initiate the brake action.

Upon release of the pedal, the spring 146 returns the piston and sleeve to their normal relative positions, and the fluid under pressure acting on the large head 68 and on the right end of sleeve 120 tends to return the sleeve to its normal position at the left so that element 156 engages land 52. This unseats valve head 140 which allows the fluid under pressure which was acting on the large head 68 to be dissipated through opening 113, radial passage 108 and reservoir port 84 to reservoir. The release of fluid under pressure acting on the large head 68 of the piston permits the piston to return to the left under the influence of spring 92, and the pressure built up in the brakes. When the piston has nearly reached its extreme leftward position, valve pin 102 engages the flange 74 to unseat ball valve 96 to open that part of the system from valve 18 to the brakes, to reservoir. Connecting this portion of the system to reservoir after each brake application, as aforementioned, insures a full volume of oil at all times.

Although the invention has been described in connection with certain specific embodiments, the principles are susceptible of numerous other applications that will readily occur to those skilled in the art. The invention is, therefore, to be limited only as indicated by the scope of the appended claims.

Having thus described the various features of the invention, what I claim as new and desire to secure by Letters Patent is:

I claim:

1. A valve for use in a hydraulic system comprising a body, a bore in the body, a piston in the bore having a normal relative position therein, a first working port opening into the bore, a reservoir port opening into the bore, a spring biasing the piston to its normal relative position in the bore, said piston responsive to fluid under pressure acting on one end thereof to move the same against the spring to put fluid under pressure in the first working port, said piston and bore together constituted to provide a chamber which is in constant communication with said reservoir port only, a passage in the piston connecting the chamber to said one end of the piston, a valve seat in the passage, a pumping port opening into the bore, a second working port opening into the bore and axially spaced apart from the pumping port opening, operator operated means in the bore to control communication between the pumping port and the second working port and said one end of the piston, said means including a sleeve, a piston valve in the sleeve, a land in the bore intermediate the pumping port and second working port to cooperate with the exterior of the sleeve to provide a barrier to the passage of fluid between the pumping port and second working port exteriorly of the sleeve, and a valve head carried by the piston valve to normally engage the valve seat to obturate the passage, said sleeve having openings therein to connect the pumping port to the second working port and to said one end of the piston through the interior of the sleeve, said piston valve constructed and arranged to cooperate with the openings in the sleeve to normally establish communication between the pumping port and the second working port and cut off communication between the pumping port and said one end of the piston, said sleeve and piston valve movable together in the bore and also relatively movable whereby movement of the sleeve in the bore relative to the piston valve restricts communication between the pumping port and the second working port and establishes communication between the pumping port and said one end of the piston to subject that end of the piston to fluid under pressure to move the piston toward one end of the bore to put fluid in the first working port under pressure.

2. A valve for use in a hydraulic system comprising a body, a bore in the body, a piston in the bore having a normal relative position therein, a first working port opening into the bore, a reservoir port opening into the bore, a spring biasing the piston to its normal relative position in the bore, said piston responsive to fluid under pressure acting on one end thereof to move the same against the spring to put fluid under pressure in the first working port, said piston and bore together constituted to provide a chamber which is in constant communication with said reservoir port only, a passage in the piston connecting the chamber to said one end of the piston, a valve seat in the passage, a pumping port opening into the bore, a second working port opening into the bore, operator operated means in the bore to control communication between the pumping port and the second working port and said one end of the piston, said means including a sleeve, a piston valve in the sleeve, a land in the bore intermediate the pumping port and second working port to cooperate with the exterior of the sleeve to provide a barrier to the passage of fluid between the pumping port and second working port exteriorly of the sleeve, and a valve head carried by the piston valve to normally engage the valve seat to obturate the passage, said valve seat constructed and arranged to move out of engagement with the valve head in response to fluid under pressure above a predetermined value acting on said one end of the piston to release said pressure to reservoir, said sleeve having openings therein to connect the pumping port to the second working port and to said one end of the piston through the interior of the sleeve, said piston valve constructed and arranged to cooperate with the openings in the sleeve to normally establish communication between the pumping port and second working port and cut off communication between the pumping port and said one end of the piston, said sleeve and piston valve movable together in the bore and also relatively movable whereby movement of the sleeve in the bore relative to the piston valve restricts communication between the pumping port and the second working ports and establishes communication between the pumping port and said one end of the piston to subject that end of the piston to fluid under pressure to move the piston toward one end of the bore to put fluid in the first working port under pressure.

3. A valve for controlling the flow of fluid comprising a body, a bore in the body, a first working port opening into one end of the bore, a reservoir port opening into the bore, a piston slideable in one end of the bore to put fluid in the first working port under pressure when the piston is moved toward said one end of the bore, a spring disposed in one end of the bore to urge the piston toward the other end thereof, said piston movable to said one end of the bore by fluid under pressure acting on one end of the piston, said piston and bore together constituted to provide a chamber which is in constant communication with said reservoir port, a passage in the piston to provide communication between the chamber and said one end of the piston, a valve seat in the passage, a pumping port opening into the bore, a second working port opening into the bore, and means disposed in the bore to control the flow of fluid from the pumping port to the second working port and to said one end of the piston, said means including means to normally establish communication between the pumping port and the second working port and to cut off communication between the pumping port and said one end of the piston and having a valve head constructed and arranged to seat on the valve seat to normally close the passage, said first and second mentioned means movable in the bore as a unit and also relatively movable to restrict communication between the pumping port and the second working port and establish communication between the pumping port and said one end of the piston to subject that end of the piston to fluid under pressure to thereby move the piston to put fluid in the first working port under pressure.

4. In a valve of the class described in claim 3, wherein means is provided to establish communication between the first working port and the reservoir port when the piston is moved to a predetermined position in the bore under the influence of the spring to thereby replenish the fluid in the first working port after each cycle of operation.

5. A valve for controlling the flow of fluid comprising a body, a bore in the body, a first working port opening into one end of the bore, a reservoir port opening into the bore, a piston slideable in one end of the bore to put fluid in the first working port under pressure when the piston is moved toward said one end of the bore, a spring disposed in one end of the bore to urge the piston toward the other end thereof, said piston movable to said one end of the bore by fluid under pressure acting on one end of the piston, said piston and bore together constituted to provide a chamber which is in constant communication with said reservoir port only, a passage in the piston to provide communication between the chamber and said one end of the piston, a valve seat in the passage, a pumping port opening into the bore, a second working port opening into the bore, and means disposed in the bore to control the flow of fluid from the pumping port to the second working port and to said one end of the piston, said means including means to normally establish communication between the pumping port and the second working port and to cut off communication between the pumping port and said one end of the piston and having a valve head constructed and arranged to seat on the valve seat to normally close the passage, said valve seat constructed and arranged to move away from the valve head to release fluid under pressure acting on said one end of the piston when the pressure exceeds a predetermined value, said first and second mentioned means movable in the bore as a unit and also relatively movable to restrict communication between the pumping port and the second working port and establish communication between the pumping port and said one end of the piston to subject the same to fluid under pressure to thereby move the piston to put fluid in the first working port under pressure.

6. A valve for controlling the flow of fluid comprising a body, a bore in the body, a first working port opening into one end of the bore, a reservoir port opening into the bore, a piston slideable in one end of the bore to put fluid in the first working port under pressure when the piston is moved toward said one end of the bore, a spring disposed in one end of the bore to urge the piston toward the other end thereof, said piston movable to said one end of the bore by fluid under pressure acting on one end of the piston, said piston and bore together constituted to provide a chamber which is in constant communication with said reservoir port only, a passage in the piston to provide communication between the chamber and said one end of the piston, a valve seat in the passage, a pumping port opening into the bore, a second working port opening into the bore, and means disposed in the bore to control the flow of fluid from the pumping port to the second working port and to said one end of the piston, said means including means to normally establish communication between the pumping port and the second working port and to cut off communication between the pumping port and said one end of the piston and having a valve head constructed and arranged to seat on the valve seat to normally close the passage, said first and second mentioned means movable in the bore as a unit and also relatively movable to restrict communication between the pumping port and the second working port and establish communication between the pumping port and said one end of the piston to subject that end of the piston to fluid under pressure to thereby move the piston to put fluid in the first working port under pressure, said first mentioned means is so arranged within the bore that should fluid under pressure not be available, said first mentioned means can be manually moved in a direction to engage said one end of the piston to move the same toward said one end of the bore to put fluid in the first working port under pressure.

7. A valve for use in a fluid system comprising a body, a bore in the body, a piston located in one end of the bore and having a normal relative position therein, a first working port in said one end of the bore, a spring urging the piston toward its normal relative position, said piston movable out of its normal relative position against the spring in response to fluid under pressure acting on one end of the piston to thereby put fluid in the first working port under pressure, a reservoir port opening into the bore, a pumping port opening into the bore, a second working port opening into the bore, means located in the bore to control the flow of fluid between the pumping port and the second working port and said one end of the piston, and means associated with the piston including a valve normally closed and operatively connected to said first mentioned means to control the release of fluid under pressure acting on said one end of the piston to the reservoir port, said first mentioned means comprising nested sleeve and piston valve disposed within the bore for limited axial movement as a unit in either direction and relatively slidable with respect to each other for a limited axial distance in either direction from a normal relative position, said sleeve and piston valve together constituted so that when they are in their normal relative position communication is established between the pumping port and the second working port and cut off between the pumping port and said one end of the piston and, when said sleeve and piston valve are moved relative to each other communication is restricted between the pumping port and the second working port and established between the pumping port and said one end of the piston to move the same against the spring to put fluid in the first working port under pressure, said first mentioned means responsive to the fluid under pressure acting on said one end of the piston to open said normally closed valve to effect release of the fluid to the reservoir port.

8. A valve for controlling the flow of fluid comprising a body having a bore therein, a piston in the bore dividing the same into opposed chambers, a first port in said body opening into one end of said bore, a second port in said body normally uncommunicable with the ends of said bore, valve means carried by said piston for establishing communication between said second port and the other end of said bore, third and fourth ports opening into the other end of said bore, axially shiftable means arranged in the other end of said bore so that said third port is normally in communication with said fourth port, said piston movable to said one end of the bore under the influence of fluid under pressure acting on one end thereof to thereby put fluid in said first port under pressure, a spring in said one end of the bore arranged to urge said piston toward the other end thereof, said axially shiftable means comprising a valve mechanism mechanically interconnected with said valve means and operative to restrict communication between said third and fourth ports and establish communication between said third port and said one end of the piston, to thereby move the same toward one end of said bore.

9. A valve for controlling the flow of fluid comprising a body having a bore therein, a piston in the bore, a first port in said body opening into one end of said bore, a second port in said body normally uncommunicable with the ends of said bore, valve means carried by said piston for establishing communication between said second port and the other end of said bore, third and fourth ports opening into the other end of said bore, fluid control means arranged in the other end of said bore so that said third port is normally in communication with said fourth port, said piston movable to said one end of the bore under the influence of fluid under pressure acting on one end thereof to thereby put fluid in said first port under pressure, and means in said one end of the bore for urging said piston toward the other end thereof, said control means comprising a valve mechanism mechanically interconnected with said valve means and operative to restrict communication between said third and fourth ports and establish communication between said third port and said one end of the piston.

STANLEY I. MacDUFF.

REFERENCES CITED

The following references are of record in the file of this patent:

UNITED STATES PATENTS

| Number | Name | Date |
|---|---|---|
| 1,846,089 | Davis | Feb. 23, 1932 |
| 2,410,269 | Chouings | Oct. 29, 1946 |